US010434860B2

(12) United States Patent
Chen et al.

(10) Patent No.: US 10,434,860 B2
(45) Date of Patent: Oct. 8, 2019

(54) KART

(71) Applicant: RAZOR USA LLC, Cerritos, CA (US)

(72) Inventors: Robert (Wei-Pin) Chen, San Marino, CA (US); Tony Wang, Cerritos, CA (US)

(73) Assignee: RAZOR USA LLC, Cerritos, CA (US)

(*) Notice: Subject to any disclaimer, the term of this patent is extended or adjusted under 35 U.S.C. 154(b) by 0 days.

(21) Appl. No.: 15/626,742

(22) Filed: Jun. 19, 2017

(65) Prior Publication Data
US 2018/0029458 A1    Feb. 1, 2018

Related U.S. Application Data

(63) Continuation of application No. 14/709,376, filed on May 11, 2015, now abandoned.
(Continued)

(30) Foreign Application Priority Data

May 13, 2014 (CN) .................... 2014 2 0243669 U
May 13, 2014 (CN) .................... 2014 2 0243670 U
(Continued)

(51) Int. Cl.
B60K 1/04    (2019.01)
B60R 21/13    (2006.01)
(Continued)

(52) U.S. Cl.
CPC ............... B60K 1/04 (2013.01); B60K 20/04 (2013.01); B60L 50/50 (2019.02); B60R 21/13 (2013.01);
(Continued)

(58) Field of Classification Search
None
See application file for complete search history.

(56) References Cited

U.S. PATENT DOCUMENTS 3,062,559 A   6/1959  Hewitt
D189,614 S    1/1961  Beale
(Continued)

FOREIGN PATENT DOCUMENTS

CN         2936826       8/2007
CN       200977859      11/2007
(Continued)

OTHER PUBLICATIONS

Aamoth, Doug, "Razor Builds the Ultimate Drifting Go-Kart: Why Must I Always Be Over the Weight Limit for Everything Good in This World?," Jul. 11, 2013, retrieved on Aug. 6, 2016, http://techland.time.com/2013/07/11/razor-builds-the-ultimate-drifting-go-kart-why-must-i-always-be-over-the-weight-limit-for-everything-good-in-this-world/, in 2 pages.
(Continued)

Primary Examiner — Paul N Dickson
Assistant Examiner — Hilary L Johns
(74) Attorney, Agent, or Firm — Knobbe, Martens, Olson & Bear, LLP

(57) ABSTRACT

A kart having a pedal speed controller and other components and arrangements thereof are disclosed. The kart can be provided with a controller for controlling speed; the pedal speed controller comprising a pedestal and a pedal, one end of the pedal is articulated with the pedestal and keeps a certain angle with the pedestal. The pedal speed controller also comprises a sensor connected with the controller, and the sensor can obtain displacement signal along the tread direction of the pedal. The pedal speed controller has the advantages of realizing pedal control of acceleration or
(Continued)

deceleration for drivers, avoiding interference with manual adjustment of kart direction, preventing from mutual influence between speed regulation and steering, improving the speed control performance of the kart, and improving the driving experience.

20 Claims, 8 Drawing Sheets

Related U.S. Application Data

(60) Provisional application No. 61/994,714, filed on May 16, 2014.

(30) Foreign Application Priority Data

May 13, 2014 (CN) .................. 2014 2 0243683 U
May 13, 2014 (CN) .................. 2014 2 0244267 U

(51) Int. Cl.
    B60K 20/04     (2006.01)
    G05G 1/30      (2008.04)
    B60L 50/50     (2019.01)
    G05G 1/44      (2008.04)

(52) U.S. Cl.
    CPC ............... *G05G 1/30* (2013.01); *G05G 1/44* (2013.01); *B60Y 2200/86* (2013.01)

(56) References Cited

U.S. PATENT DOCUMENTS

| | | |
|---|---|---|
| D190,024 S | 4/1961 | Rouse |
| 3,053,550 A | 9/1962 | Joachim et al. |
| 3,099,326 A | 7/1963 | Weigel et al. |
| 3,125,177 A * | 3/1964 | Paller ............... F16B 2/06 180/68.5 |
| 3,512,599 A | 5/1970 | Hott et al. |
| 3,533,484 A | 10/1970 | Wood |
| D222,283 S | 10/1971 | Reeves |
| 3,799,283 A | 3/1974 | Freber |
| 3,938,608 A | 2/1976 | Folco-Zambelli |
| 3,960,392 A | 6/1976 | Read |
| D243,627 S | 3/1977 | Clower |
| D246,198 S | 10/1977 | Rose |
| 4,065,144 A | 12/1977 | Winchell |
| D249,496 S | 9/1978 | Morgan |
| D252,714 S | 8/1979 | Tidwell |
| 4,281,844 A | 8/1981 | Jackman et al. |
| 4,359,231 A | 11/1982 | Mulcahy |
| 4,403,673 A | 9/1983 | Ball |
| D276,058 S | 10/1984 | Rogers |
| D280,916 S | 10/1985 | Castle |
| 4,572,535 A | 2/1986 | Stewart |
| D290,451 S | 6/1987 | Engum |
| 4,750,578 A | 6/1988 | Brandenfels |
| 4,826,190 A | 5/1989 | Hartmann |
| 4,896,899 A | 1/1990 | Lawrence |
| 4,898,508 A | 2/1990 | Hayata |
| 4,915,075 A * | 4/1990 | Brown ............... B60K 26/02 123/399 |
| 4,944,360 A | 7/1990 | Sturges |
| 4,993,733 A | 2/1991 | Eilers |
| 5,036,938 A | 8/1991 | Blount et al. |
| D320,420 S | 10/1991 | Dupont |
| D320,586 S | 10/1991 | Tellinghuisen |
| D332,765 S | 1/1993 | Tellinghuisen |
| D332,977 S | 2/1993 | Huffman et al. |
| 5,257,671 A | 11/1993 | Watkins |
| 5,265,690 A | 11/1993 | Amundsen et al. |
| 5,477,936 A | 12/1995 | Sugioka et al. |
| 5,479,998 A | 1/1996 | Ishikawa |
| 5,494,126 A | 2/1996 | Meeker |
| D369,130 S | 4/1996 | Cummings |
| D378,226 S | 2/1997 | Sundqvist |
| 5,628,379 A | 5/1997 | Watkins |
| 5,826,670 A | 10/1998 | Nan |
| D408,869 S | 4/1999 | Patmont |
| 5,904,218 A | 5/1999 | Watkins |
| D412,138 S | 7/1999 | Triarsi et al. |
| 6,026,923 A | 2/2000 | Uphaus |
| 6,047,786 A * | 4/2000 | Stevenson ............ B62K 11/10 180/65.1 |
| D440,607 S | 4/2001 | Mahlow |
| 6,267,190 B1 | 7/2001 | Micheletti |
| 6,276,480 B1 | 8/2001 | Aregger |
| 6,349,786 B1 | 2/2002 | Gift |
| D460,723 S | 7/2002 | Smit |
| D465,814 S | 11/2002 | Kovelski |
| D466,560 S | 12/2002 | Stolpmann |
| D469,819 S | 2/2003 | Nicolle et al. |
| D471,936 S | 3/2003 | Tilbor et al. |
| D483,420 S | 12/2003 | Delong et al. |
| D488,194 S | 4/2004 | Fox et al. |
| 6,729,421 B1 | 5/2004 | Gluck |
| 6,749,039 B1 | 6/2004 | Uphaus |
| 6,766,871 B2 | 7/2004 | Sawyer |
| D512,467 S | 12/2005 | Hadley et al. |
| 7,117,967 B2 | 10/2006 | Kidd |
| 7,198,322 B2 | 4/2007 | Savo |
| D562,914 S | 2/2008 | Oveson et al. |
| D570,572 S | 6/2008 | Whiteside et al. |
| D574,297 S | 8/2008 | Carl |
| D575,675 S | 8/2008 | Williams et al. |
| D582,992 S | 12/2008 | Alais |
| 7,552,934 B2 | 6/2009 | Lee et al. |
| D601,640 S | 10/2009 | McIlvain et al. |
| D608,250 S | 1/2010 | Van De |
| D611,106 S | 3/2010 | Van Beek |
| 7,712,558 B2 | 5/2010 | Helson et al. |
| 7,823,675 B2 | 11/2010 | Kermani |
| D637,116 S | 5/2011 | Kettler |
| D637,660 S | 5/2011 | Markowitz |
| 8,091,658 B2 | 1/2012 | Peng |
| 8,356,686 B2 | 1/2013 | Kermani |
| 8,365,850 B2 | 2/2013 | Gal et al. |
| D682,746 S | 5/2013 | Doherty et al. |
| D692,505 S | 10/2013 | Jiang |
| D692,506 S | 10/2013 | Jiang |
| D705,128 S | 5/2014 | Patterson et al. |
| 8,801,005 B1 | 8/2014 | Flickner et al. |
| 8,820,460 B2 | 9/2014 | Chen |
| 8,840,131 B1 | 9/2014 | Calley |
| 8,875,831 B2 | 11/2014 | Kermani |
| 8,931,583 B2 | 1/2015 | Tuckowski |
| 9,102,375 B2 | 8/2015 | Kermani |
| 9,139,248 B2 | 9/2015 | Xiao |
| D761,700 S | 7/2016 | Kermani |
| D766,780 S | 9/2016 | Fusco |
| D771,196 S | 11/2016 | Chen |
| 9,499,220 B2 | 11/2016 | Kermani |
| D774,602 S | 12/2016 | Desberg |
| D774,981 S | 12/2016 | Chen |
| D775,282 S | 12/2016 | Williams et al. |
| D776,204 S | 1/2017 | Van Der Berg |
| 9,557,740 B2 | 1/2017 | Crawley |
| D778,369 S | 2/2017 | Douma et al. |
| D783,726 S | 4/2017 | Williams et al. |
| D787,379 S | 5/2017 | Kermani |
| D792,811 S | 7/2017 | Kermani et al. |
| D793,480 S | 8/2017 | Chen |
| D793,481 S | 8/2017 | Kermani et al. |
| D793,912 S | 8/2017 | Kermani |
| D807,438 S | 1/2018 | Desberg |
| D820,733 S | 6/2018 | Chen |
| D830,469 S | 10/2018 | Kermani et al. |
| D830,470 S | 10/2018 | Chen |
| 10,245,194 B2 | 4/2019 | Kermani |
| 2004/0035627 A1 | 2/2004 | Richey et al. |
| 2004/0040769 A1 | 3/2004 | Richey et al. |
| 2004/0199311 A1 | 10/2004 | Aguilar et al. |
| 2007/0045022 A1 | 3/2007 | Greig et al. |

(56) References Cited

U.S. PATENT DOCUMENTS

| | | |
|---|---|---|
| 2008/0122209 A1* | 5/2008 | Jayasuriya .............. B60R 3/002 280/755 |
| 2008/0196951 A1 | 8/2008 | Gal et al. |
| 2009/0065272 A1 | 3/2009 | Martin et al. |
| 2010/0032223 A1* | 2/2010 | Kermani ................ A63G 25/00 180/216 |
| 2011/0042912 A1 | 2/2011 | Kermani |
| 2012/0133111 A1 | 5/2012 | Schmutzer et al. |
| 2015/0328994 A1 | 5/2015 | Chen et al. |
| 2017/0156953 A1 | 6/2017 | Kermani |
| 2018/0043950 A1 | 2/2018 | Kermani et al. |

FOREIGN PATENT DOCUMENTS

| | | |
|---|---|---|
| CN | 201009762 Y | 1/2008 |
| CN | 203186508 U | 9/2013 |
| CN | 203427959 U | 2/2014 |
| EP | 0529188 A1 | 3/1993 |
| FR | 859864 A | 12/1940 |
| WO | WO 2018/035060 A1 | 2/2018 |

OTHER PUBLICATIONS

OTL Electrokart, "Storm Series—Competition" Datasheet, Jun. 14, 2014, retrieved on Aug. 6, 2016, https://www.kart1.com/pdf/competition.pdf, in 3 pages.

International Written Opinion of International Patent Application No. PCT/CN2017/072086, dated May 19, 2017.

* cited by examiner

KART

INCORPORATION BY REFERENCE TO ANY PRIORITY APPLICATIONS

Any and all applications for which a foreign or domestic priority claim is identified in the Application Data Sheet as filed with the present application are hereby incorporated by reference and made a part of the present disclosure.

BACKGROUND

Field

The disclosure relates to the field of vehicle body technology, in particular to a kart.

Description of the Related Art

A kart, pertaining to a micro racer, is often characterized by a compact appearance and simple structure, and has a wide market appeal. One type of kart is disclosed in Applicant's U.S. Pat. No. 7,823,675, the entirety of which is incorporated by reference herein.

A kart usually comprises a baseplate or chassis and may include a frame arranged on the baseplate; the steering gear of the kart is arranged on the frame for controlling the driving wheel to steer. Usually, the kart is power driven by a battery, which supplies power for wheel steering and kart running.

At present, both the frame and the steering gear are arranged at the front end of the kart, a driver's seat is arranged at the rear end thereof, a battery box is arranged at the rear of the driver's seat, and the battery is arranged inside the battery box. The running speed is mainly subject to manual control of the driver, for example, a vehicle speed control panel is arranged on the frame, or a vehicle speed control button is arranged on the steering wheel.

SUMMARY

Presented herein are advantageous features and improvements on the kart of U.S. Pat. No. 7,823,675. For example, it may be desirable to reduce the manufacturing cost or increase the ease of manufacturing while maintaining or improving performance. The systems, methods and devices described herein have innovative aspects, no single one of which is indispensable or solely responsible for their desirable attributes. Without limiting the scope of the claims, some of the advantageous features will now be summarized.

The disclosure involves a kart which can be controlled by a pedal speed controller in terms of speed control, thus improving the speed control performance.

The disclosure involves a kart and a pedal speed controller. The kart is provided with a controller for controlling speed. The pedal speed controller comprises a pedestal and a pedal. One end of the pedal is articulated with the pedestal and keeps a certain angle with the pedestal. The pedal speed controller also comprises a sensor connected with the controller. The sensor can obtain displacement signal along the tread direction of the pedal.

The pedal speed controller as illustrated below has the advantages of realizing pedal control of acceleration or deceleration for drivers, avoiding interference with manual adjustment of kart direction, inhibiting or preventing mutual influence between speed regulation and steering, improving the speed control performance of the kart, and improving the driving experience.

In some aspects, a sliding block is arranged between the pedal and the pedestal, the sliding block is connected to the pedal, and the pedestal is provided with a sliding hole. The sliding block slides along the sliding hole when the pedal is depressed. The sensor detects a displacement signal of the sliding block so as to obtain a displacement signal along the tread direction of the pedal.

In some aspects, the sensor is arranged on the pedestal, the sliding block is provided with a magnet strip extending along the height direction thereof, and the sensor induces the magnet strip. In some aspects, the pedal speed controller also comprises a microswitch for starting the kart. In some aspects, the sliding block is provided with an embossment, and the pedal is trodden or depressed so that the microswitch is touched and started by the embossment when the sliding block moves down a sufficient (e.g., a preset) distance. In some aspects, the embossment is shaped like a cam.

In some aspects, a spring shield is arranged between the pedestal and the pedal, and both the sliding block and the sensor are wrapped inside the spring shield. In some aspects, a torsion spring is arranged between the pedestal and the pedal so as to maintain a certain angle between both the pedestal and the pedal.

The disclosure also involves a kart comprising a baseplate, a frame arranged on the baseplate, and a controller for controlling the kart. The kart also comprises the pedal speed controller. The sensor of the pedal speed controller is connected to the controller, and the controller can, on the basis of a displacement signal detected by the sensor, control the speed of the kart.

In some aspects, the kart also comprises a battery for providing the kart with power. The frame is arranged at the front end of the kart and is used for installing a front fork steering component of the kart, the front fork steering component is connected to a driving front wheel of the kart, and both the controller and the battery are arranged at the frame.

In some aspects, the front fork steering component is arranged in the middle of the frame. The battery is arranged on the baseplate and positioned between the front fork steering component and the rear frame body of the frame. In some aspects, the battery adjoins to the rear frame body of the frame. In some aspects, the controller is installed on the rear frame body of the frame and positioned above the battery. In some aspects, the kart also comprises a shell for wrapping or enclosing the frame and the battery, controller and front fork steering component are positioned inside the shell.

In some aspects, the kart also comprises a positioning structure for fixing the battery on the baseplate. The positioning structure comprises a lock piece and the lock piece is used for locking and positioning the battery on the baseplate. In some aspects, the lock piece comprises a transverse segment locked on the upper surface of the battery, a lateral segment positioned at the lateral side of the battery, and a transverse permanent seat fixed to the baseplate; the transverse segment provided with a plughole.

The positioning structure also comprises a lock hook and a nut. The baseplate is provided with a hook part, and the lock hook is hooked to the hook part; one end of the lock hook can be inserted into the plughole and fixed to the transverse segment of the lock piece by the nut.

In some aspects, the baseplate is provided with an installation slot, and the battery is locked by the lock piece inside the installation slot.

In some aspects, the baseplate and/or the frame constitute an all-in-one sheet-metal structure.

In some aspects, both sides of the baseplate are provided respectively with an anti-sway pillar or anti-roll column such that a suitable (e.g., preset) distance is kept from the anti-sway pillar to the ground. In some aspects, the anti-sway pillar is arranged on the bottom of the baseplate. In some aspects, the anti-sway pillar is arranged at the front end of the kart and positioned at the rear of the driving front wheel, such as rearward of a front edge of the front wheel when the front wheel is in the straight position. In some aspects, both sides of the baseplate are provided respectively with an anti-sway pillar. In some aspects, the anti-sway pillar is arranged aslant or inclined (relative to vertical direction). In some aspects, the anti-sway pillar has an angle of inclination ranging from 5 degrees to 15 degrees. In some aspects, the anti-sway pillar comprises a metal cylinder and a wear-proof casing arranged at one end of the metal cylinder, the other end of the metal cylinder is installed on the baseplate. In some aspects, the metal cylinder is a hollow structure. In some aspects, the metal cylinder is fixed to the baseplate, and/or the wear-proof casing is fixed to the metal cylinder by bolts.

In some aspects, a kart includes a frame; a baseplate supported by the frame; a seat supported by the frame; a front fork rotatably supported by the frame; a front wheel rotatably supported by the front fork; a motor operably coupled to the front wheel so that it can drive the front wheel; a controller operably coupled to the motor and configured to control a speed of the kart, the controller comprising a pedestal; a pedal, wherein one end of the pedal is articulated with respect to the pedestal and the pedal maintains a certain angle with respect to the pedestal; and a sensor connected to the controller, the sensor configured to determine a displacement signal of the pedal; wherein the controller controls the speed of the kart based on the displacement signal detected by the sensor.

In some aspects, the kart further includes a battery configured to power the kart, wherein the battery is supported by the baseplate adjacent the front wheel and forward of the seat, and the controller is supported by the frame facing a rider on the kart. In other aspects, the front fork is arranged along a longitudinal axis of the frame, and the battery is supported by the baseplate and positioned on the longitudinal axis of the frame. In some aspects, the kart further includes a shell configured to cover a top portion of the frame and enclose at least a portion of the battery, the controller, and the front fork. In some aspects, the kart further includes a positioning structure configured to attach the battery to the baseplate, the positioning structure comprising a lock piece, a lock hook and a nut, wherein the lock piece comprises a transverse segment configured to attach to an upper surface of the battery, a lateral segment positioned at a lateral side of the battery, and a transverse permanent seat attached to the baseplate, the transverse segment including a plughole such that one end of a lock hook can be inserted into the plughole and fixed to the transverse segment of the lock piece by the nut. In some aspects, the baseplate further comprises an installation slot and the battery is locked by the lock piece inside the installation slot. In some aspects, the baseplate or frame supports at least one anti-sway pillar to prevent the kart from tipping to either side.

In another aspect, a retention device for a kart battery includes a bracket comprising a transverse section that can apply a force to a surface of the battery, the bracket further comprising a lateral section that is coupled to the base plate of the kart, wherein the transverse section comprises a socket; a locking hook and a nut, the locking hook comprising a hook that engages a hook portion on a base plate of the kart, the locking hook further comprising an end that is inserted into the socket of the bracket and fixed to the transverse section by the nut. In some aspects, the retention device further includes at least one bolt such that the bracket is fixed to the base plate by the bolt passing through the lateral section of the bracket. In some aspects, the nut is a wing nut.

In yet another aspect, a kart includes a base plate and a gantry connected to the base plate; a front fork steering assembly mounted on the gantry; and a battery configured to power the kart, the battery mounted on the base plate via a positioning means, wherein the positioning means comprising a retention device comprising a bracket comprising a transverse section that can apply a force to a surface of the battery; a lateral section that is coupled to the base plate of the kart, wherein the transverse section comprises a socket; a locking hook and a nut, the locking hook comprising a hook that engages a hook portion on a base plate of the kart, the locking hook further comprising an end that is inserted into the socket of the bracket and fixed to the transverse section by the nut; and wherein the base plate further comprises a hook body bore that receives a portion of the locking hook after the locking hook is inserted into a shift hole and shifted toward the hook body bore and wherein the hook portion of the locking hook engages the base plate of the kart between the shift hole and the hook hole and wherein the base plate further comprises a mounting groove such that the bracket retains the battery in the mounting groove.

In another aspect, a kart includes a body comprising a floor or base plate and a gantry located at the front end of the body; a front fork steering assembly supported by the gantry, wherein a front drive wheel is supported by the front fork steering assembly; at least one anti-roll column connected to the base plate and having a lower end spaced a clearance distance from the ground; a motor supported by the front fork steering assembly and configured to drive the front drive wheel; and a battery configured to provide power to the motor, the battery being positioned adjacent to and rearward of the front drive wheel. In some aspects, the anti-roll column is attached directly to the base plate. In some aspects, the anti-roll column is located rearward of a forward edge of the front drive wheel. In some aspects, each of the left and right sides of the baseplate comprises an anti-roll column. In some aspects, the anti-roll column is inclined with respect to a vertical direction.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
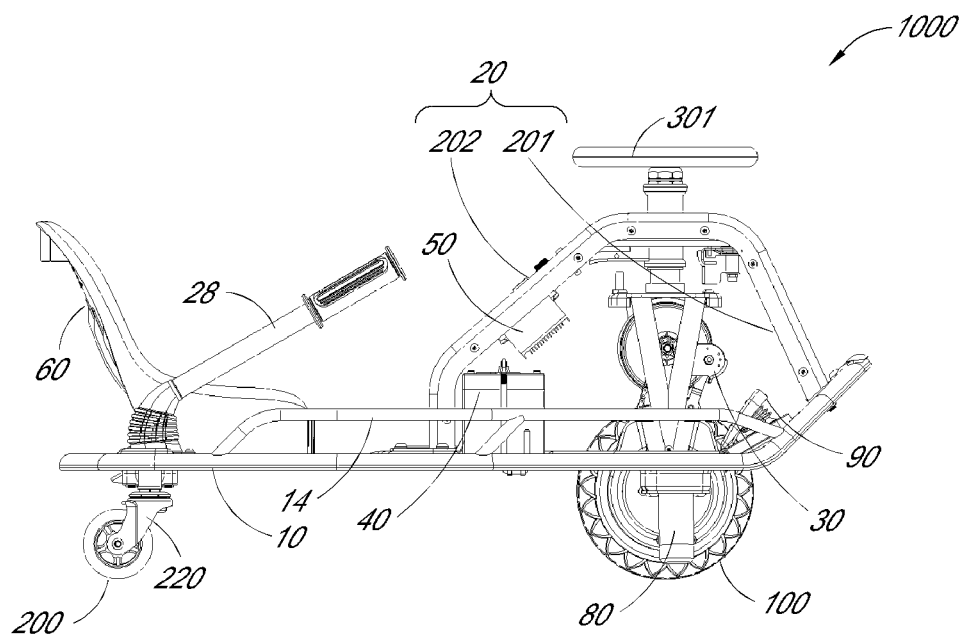
FIG. 1 is a side view of a kart in accordance with an embodiment of the invention.

Embodiments of the kart, components, and arrangements thereof and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Overview

Turning now to the drawings, drifting karts that are front wheel drive and include rear caster wheels that can be dynamically engaged to induce and control drift during a turn in accordance with embodiments of the invention are illustrated. A caster wheel typically includes a wheel configured to rotate around a rotational axis and a fork supporting the wheel, which enables the wheel to swivel around a swivel axis. When the caster wheels of the drifting kart contact a track surface and the caster wheels are free to swivel around their swivel axes, the caster wheels are considered "engaged" and the kart can be steered into a drift. The caster wheels can be "disengaged" to steer the kart normally by either limiting the extent to which the caster wheels can swivel or by shifting the caster wheels so that they do not contact the track surface.

In a number of embodiments, a hand lever controls the engagement of the caster wheels and can be used by a driver to induce and control drift during a turn. Pulling on the hand lever simulates a hand brake drifting technique used to initiate drift in a rear wheel drive automobile with a limited slip differential. In many embodiments, the caster wheels are mounted to a rotatable member and the hand lever rotates the rotatable member from a first position, where the caster wheels are aligned so that the weight of the drifting kart and/or the driver limits the ability of the caster wheels to swivel about their swivel axes, to a second position where the caster wheels are aligned so that they are free to swivel about their swivel axes during motion of the drifting kart.

In several embodiments, the drifting kart includes an additional pair of rear wheels fixed to an axle and the hand lever is configured to raise and lower the fixed wheels so that the caster wheels do not engage the track in the lowered position, and the caster wheels engage the track in the raised position.

In many embodiments, a zero camber zero rake fork supports the power train. The power train can be a variable speed electric motor that delivers power to a drive wheel using a chain and sprocket system or belt. In several embodiments, the zero camber zero rake fork enables the front drive wheel to rotate through 360 degrees. In a number of embodiments, the alignment of the fork that houses the power train is aligned at an angle to vertical that is sufficiently small such that the weight of the drifting kart and the driver does not prevent the full 360 degree steering of the drive wheel. In a number of embodiments, full 360 degree drift is not desired and the fork can be aligned at a greater angle to vertical.

The illustrated kart includes changes or improvements relative to the kart of Applicant's U.S. Pat. No. 7,823,675, the entirety of which is incorporated by reference herein. Thus, the kart is disclosed in the context of the differences relative to the kart of the '675 patent. Components or features not disclosed herein, such as the front housing attached to the frame, can be assumed to be the same as or similar to the corresponding component or feature of the kart of the '675 patent, or can be of another suitable arrangement.

As shown in FIG. 1, the kart 1000 comprises a baseplate 10, a steering frame 20 arranged on the baseplate 10, and a battery 40 providing a power source for the kart. The baseplate 10 is equivalent to the under pan or chassis of a vehicle. The baseplate 10 may include a chassis 12 which is typically constructed from hollow tubing that is sufficiently flexible to provide suspension and sufficiently rigid to hold together during driving. In some configurations, a majority of the features of the kart are installed on the baseplate 10, including the driver's seat 60. Some configurations of the kart 1000 may include a pair of side rails 14 attached to the baseplate 10 or the chassis 12. The driving or steerable front wheel 100 and the rear wheels 200 are correspondingly arranged at the kart head and the kart tail. The kart 1000 is also provided with a controller 50 which is used for controlling the kart via programming, for example, starting, braking, speeding up and slowing down etc. The controller 50 is powered by the battery 40.

The frame 20 is arranged at the front end or head of the kart and is attached to the baseplate 10 of the chassis 12. The frame 20 is used to support the front fork steering component 30 of the kart. The fork steering component 30 comprises a drive train including a transmission mechanism and a drive motor 32. In some configurations, the motor 32 is a variable speed DC electric motor that drives the steerable wheel 100 using a chain and sprockets. In some configurations, the motor 32 drives the steerable wheel 100 using a belt. In some configurations, the electric motor is a 250 W variable speed electric motor. In other configurations, any of a variety of electric and/or gasoline motors can be used to power the kart 1000. Although a single steerable wheel 100 is shown, two or more steerable wheels can be included in the drive train. In some configurations, the two or more wheels are aligned to enable steering through 360 degrees.

The front fork steering component 30 is connected to the steerable wheel 100 of the kart so that a driver can control the speed of the kart and steer via the steering wheel 301. In the figures, the frame 20 is approximately shaped like an inverted U. The front frame body 20 and the rear frame body are approximately shaped like an "A." In some configurations, the baseplate 10 is upturned at the front end thereof, the front end part of the front frame body 202 of the frame 20 is fixed to the upturned part, and the rear end part of the rear frame body 201 of the frame 20 is fixed to the baseplate 10. The other end part of the front frame body 202 is transitionally connected to the other end part of the rear frame body 201 and the steering wheel 301 is arranged at the transition location that is at the top or flat section of the front frame body 20.

With continued reference to FIG. 1, the kart is shown as resting on a pair of rear caster wheels 200. The rear caster wheels are mounted to a rotatable member 220 that is mounted to the baseplate 10 using a pair of brackets. In the illustrated configuration, the rotatable member is a hollow tube. In other embodiments, the rotatable member can be constructed from materials appropriate to the application. A hand lever 28, which can be referred to as a "whammy bar", is connected to the rotatable member 220. When the hand lever is lowered, the swivel axes of the rear caster wheels are aligned at a sufficiently large angle to vertical that the weight of the drifting kart and/or the driver limits the ability of the caster wheels to swivel around their swivel axes. Pulling upward on the hand lever 28 rotates the rotatable member 220. The rotation of the rotatable member 220 rotates the caster wheels under the chassis of the drifting kart and reduces the angles between the swivel axes of the caster wheels and vertical. Reducing the angles between the swivel axes of the caster wheels and vertical (i.e., the rake) enables the caster wheels to rotate more freely around the swivel axis. In this way, the hand lever can be used to engage the caster wheels and induce and control the amount of drift during a turn. The amount of drift that is allowed is determined by the angle of the caster wheels. Due to the relationship between the rotatable member and the hand lever, the angle of the caster wheels is controlled by the degree to which the rider lifts the hand lever. In one embodiment, the swivel axis of the caster wheels can rotate between a rake of 33 degrees and 0 degrees to vertical to control the amount of drift that is allowed. In other embodiments, the extent to which the swivel axis of the caster wheels can rotate relative to vertical is determined by the amount of drift desired in the specific application.

The caster wheels used in the construction of drifting karts in accordance with embodiments of the invention are typically constructed from high performance casters that include polyurethane wheels mounted to the caster fork via at least one bearing press fitted to the wheel. In one embodiment, the wheels have a 68 mm radius and the bearings are BSB ABEC 7 bearings. Although other casters appropriate to the application can also be used.

A seat 60 for the driver is also mounted to the chassis. The seat is typically positioned so that the driver is readily able to rotate the steering wheel and pull upward on the hand lever from a comfortable driving position. For stability, the seat is typically fixed to the chassis as low to the ground as possible. The higher the seat the greater the likelihood that shifting weight will cause the drifting kart to roll during cornering. In a number of embodiments, the seat 60 is located behind the battery housing 40.

Controller

Figure 2:
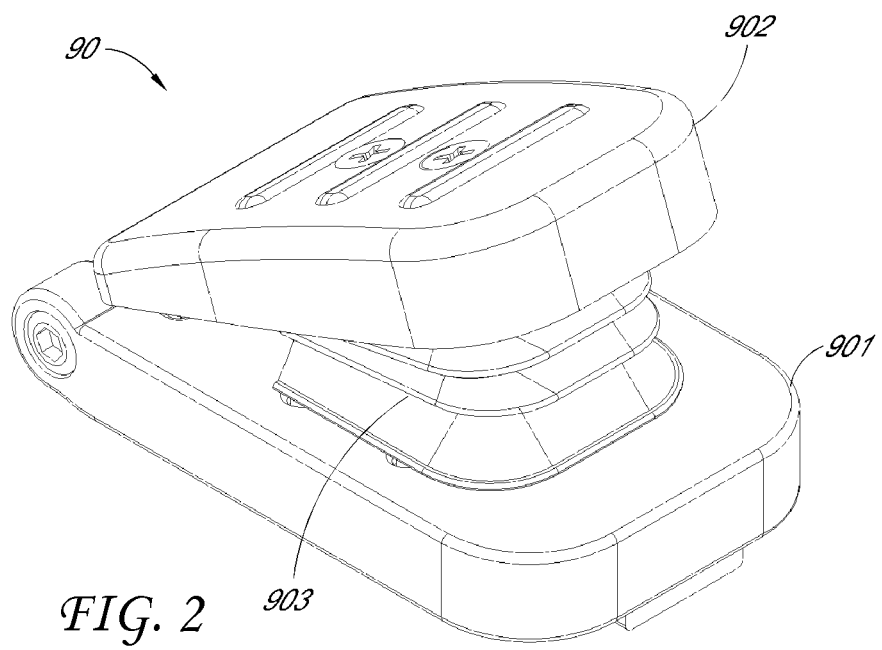
FIG. 2 is a perspective view of the pedal speed controller of a kart such as the kart shown in FIG. 1.
Figure 3:
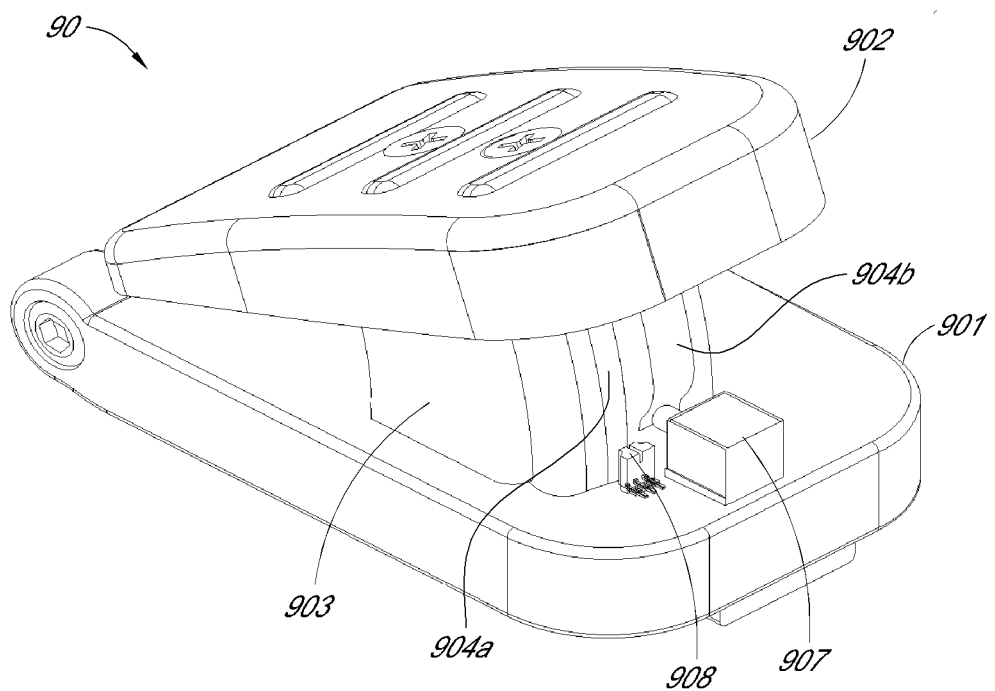
FIG. 3 is a perspective view of the pedal speed controller shown in FIG. 2 with the spring shield removed.
Figure 4:
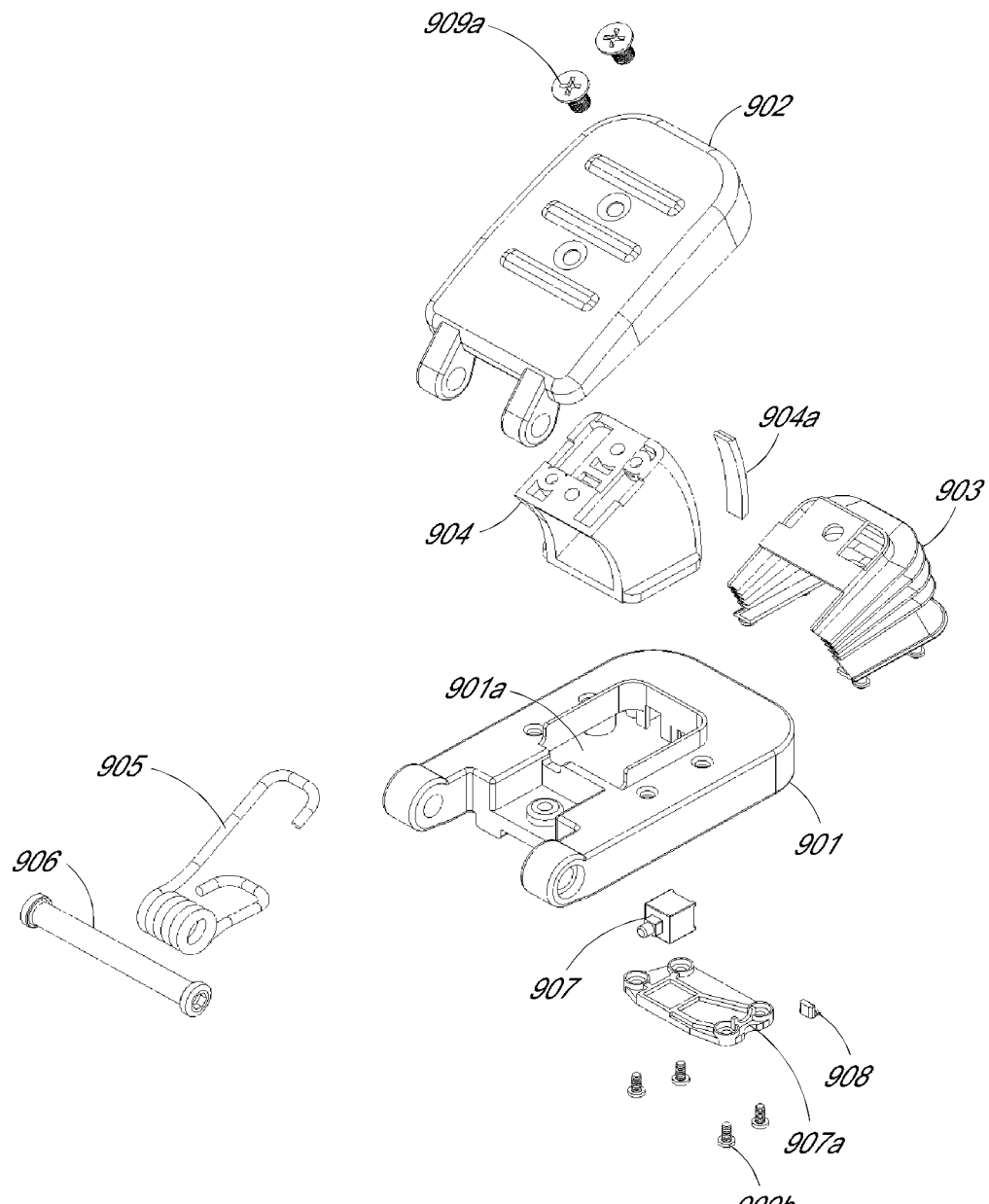
FIG. 4 is an exploded view of the pedal speed controller of FIG. 2.

With reference to FIGS. 2-4, various views of the pedal speed controller 90 are shown. FIG. 2 is a view of the pedal speed controller 90 in FIG. 1. FIG. 3 is a view of the pedal speed controller 90 in FIG. 2 whose spring shield is removed. FIG. 4 is an exploded view of the pedal speed controller illustrated in FIG. 2. As shown in FIG. 4, the upper surface of the pedestal 901 in illustrated in FIG. 3 is omitted to better illustrate the sensor 908, the microswitch 907, the embossment 904b, and the underpart of the magnet strip 904a. In some configurations, the pedestal 901 is provided with a downward-looking installation slot. The sensor 908 and the microswitch 907 are installed from the underside of the pedestal 901, which is then fixed to the baseplate 10 of the kart. This shelters the sensor 908, and microswitch 907 from exposure, and allows a convenient way to install the spring shield 903.

As illustrated, the kart 1000 also includes a pedal speed controller 90 arranged on the baseplate 10. The pedal speed controller 90 comprises a pedestal 901 and a pedal 902. One end of the pedal 902 is articulated with respect to the pedestal 901 and the pedal 902 maintains a certain angle with respect to the pedestal 901 in the absence of external force applied to the pedal. As shown in FIG. 2, the pedal 902 rotates with respect to the pedestal 901 about the shaft 906 and maintains a specified angle via a reset or biasing mechanism. The reset mechanism illustrated in FIG. 2 is a torsion spring 905. The pedal 902 can rotate about the shaft 906 and also maintain a preset angle with the pedestal 901 due to the force of the torsion spring 905. The torsion spring 905 is simple in structure and convenient for installation. In other configurations, other reset mechanisms can be used to maintain the angle the pedal 902 makes with the pedestal 901 when the pedal 902 is not depressed. In some configurations, the distance between the pedestal 901 and the pedal 902 can be shortened after the driver steps on the pedal 902 and the pedal 902 can be restored to the initial state via the torsion spring 905 (that is, the preset angle) after the driver releases the pedal 902.

The pedal speed controller 90 also comprises a sensor 908 connected to the controller 50. The sensor 908 can detect a signal (namely, a displacement signal) indicating how much the pedal 902 is pushed downwards. For example, detection of displacement of the pedal 902 along the tread direction can be measured by the sensor 908. Initially, the pedal 902 is at an initial position when no external force, such as the driver's foot, is applied. The pedal 902 starts to rotate around the shaft 906 as the driver applies a force to the pedal 902, thus displacing the pedal 902 from the initial position. The sensor 908 detects the displacement of the pedal 902 and sends the displacement signal to the controller 50 of the kart. The controller 50 can, on the basis of the displacement signal received from the sensor 908, control the speed of the kart 1000.

The relationship between the displacement signal indicating the travel of the pedal 902 and the desired speed of the kart can be pre-stored in the controller 50. Upon receiving the displacement signal, the controller 50 controls the motor 32 to rotate according to corresponding speed so as to drive the steerable wheel 100 to run at the prospective speed. The relationship between the speed and displacement of the pedal 902 can be directly proportional, namely the greater the displacement, the greater the prospective speed. In this way, the driver can increase foot pressure on the pedal 902 (resulting in greater displacement of the pedal 902) to speed up the kart and decrease foot pressure to slow down the kart, thus conveniently controlling acceleration and deceleration of the kart.

Some advantages of the pedal speed controller 90 include pedal control of acceleration or deceleration, avoiding interference with manual adjustment of kart direction, preventing mutual influence between speed regulation and steering, improving the operational performance of the kart, and improving the driving experience.

A sliding block 904 can be arranged between the pedal 902 and the pedestal 901. The sliding block 904 is connected to the pedal 902, as shown in FIG. 4, via a first bolt 909a. Correspondingly, the pedestal 901 is provided with a sliding block aperture 901a. As shown in FIG. 3, the sliding block 904 slides along the sliding block aperture 901a when the driver steps on the pedal 902 and the sensor 908 can obtain the displacement of the pedal 902 by detecting the displacement of the sliding block 904. In addition, the sliding block 904 ensures the structure of the pedal speed controller 90 is more reliable. A spring can be arranged between the sliding block 904 and the bottom of the pedestal 901 and the sliding block aperture 901a so as to further increase stability and improve tread comfort for drivers, thus facilitating control of vehicle speed.

Furthermore, the sensor 908 can be arranged on the pedestal 901, as shown in FIGS. 3 and 4. The sliding block 904 is provided with a magnetic strip 904a extending along the height of the sliding block 904 and the sensor 908 induces the magnetic strip 904a. The magnet strip 904a moves together with the sliding block 904 when the pedal 902 is depressed, thus generating displacement relative to the sensor 908. The sensor 908 detects the displacement and sends the displacement signal to the controller 50 to regulate the speed of the kart. In some configurations, the sensor 908 can be a Hall sensor with high detection accuracy for accurate speed regulation.

The pedal speed controller 90 also comprises a switch, such as a microswitch 907, for starting the kart. Thus, the pedal speed controller 90 can not only control the kart speed but also start or stop the kart. The microswitch 907 can be turned on or off in various ways. In some configurations, the driver can directly step on the microswitch 907 which placed in an accessible position. Depression of the microswitch 907 preferably does not require stepping on the pedal 902 for acceleration so as to prevent the speed control from interference. A switch mount 907a is configured for stable installation of the microswitch 907, as shown in FIGS. 3 and 4. In some configurations, the switch mount 907a is fixed to the pedestal 901 by a second bolt 909b though the switch mount 907a may be fixed to the pedestal 901 by any mechanical means.

As shown in FIGS. 3 and 4, the sliding block 904 is provided with an embossment 904b. The microswitch 907 is arranged on the pedestal 901 such that when the pedal 902 is depressed and the sliding block 904 moves down a preset distance, the microswitch 907 is touched and started by the embossment 904b to start the kart. When the pedal 902 is released, the embossment 904b moves upward relative to the microswitch 907 and again touches the microswitch 907 to stop the kart.

The embossment 904b can be designed and shaped like a cam, and the curve contour of the cam 904b allows the embossment 904b to stably touch and withdraw from the microswitch 907.

In some configurations, a spring shield 903 can be arranged between the pedestal 901 and the pedal 902. Both the sliding block 904 and the sensor 908 are preferably wrapped inside the spring shield 903. As shown in FIG. 2, the spring shield 903 can protect the sliding block 904 and other components inside. For example, the microswitch 907 can also be arranged inside the spring shield 903 for protection.

Both the controller 50 and the battery 40 of the kart 1000 are mounted adjacent to the front end of the kart. For example, the controller 50 and/or the battery 40 can be positioned within a space bounded by the frame 20 and the baseplate 10. In addition, the front fork steering component 30 of the kart is supported by the frame 20. Both the controller 50 and the front fork steering component 30 receive power from the battery 40 and thus the power circuits and control circuits are arranged at the front end of the kart to simplify wiring design and reduce potential line faults.

Moreover, the front fork steering component 30 can be supported by the middle or central, flat portion of the frame 20 to improve stability. The battery 40 can be attached to the baseplate 10 and positioned between the front fork steering component 30 and the frame body 201, 202 of the portal frame 20. As shown in FIG. 1, the battery 40, having a relatively larger volume, can be located below the frame 20 for a more compact arrangement. In some configurations, the battery 40 may be attached to the frame body of the frame 20. Due to the volume and weight of the battery 40, it may be preferable to secure the battery 40 on the baseplate 10.

Figure 5:
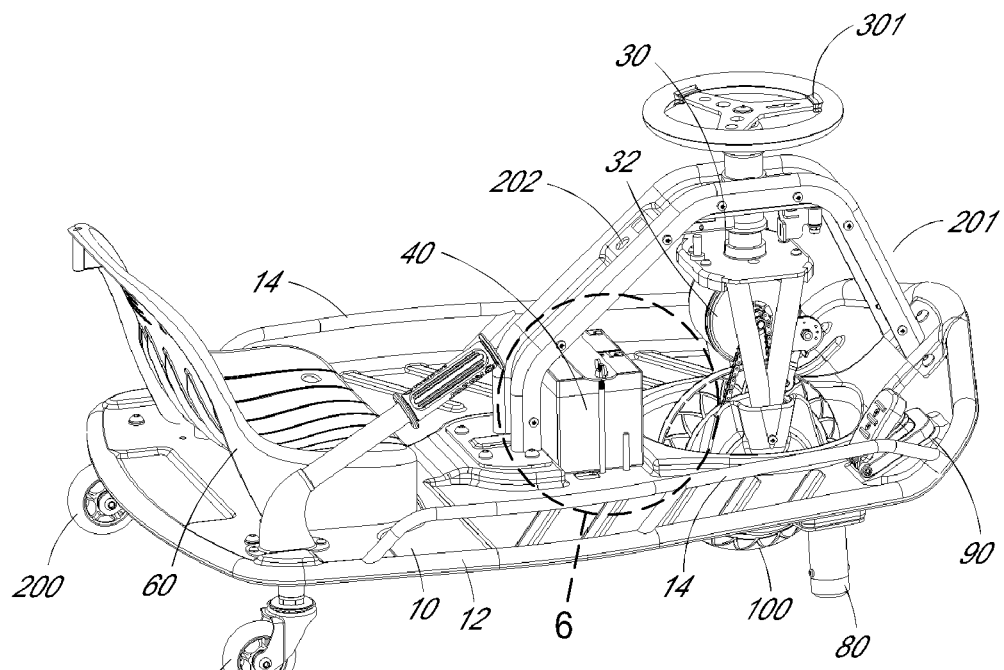
FIG. 5 is a rear perspective view of the kart of FIG. 1.

In the illustrated arrangement, the battery 40 connects the frame body of the frame 20 which comprises a front frame body 201 and a rear frame body 202. As shown in FIG. 5, the baseplate 10 below the frame 20 is provided with an opening for insertion of the front fork steering component 30 to allow the steering component 30 to connect with the driving front wheel 100. In addition, in consideration of the location of the driving front wheel 100, preferably the battery 40 is arranged adjacent to the rear frame body 202 of the frame 20.

The controller 50 can be installed on the rear frame body 202 of the frame 20 and positioned above the battery 40. As shown in FIG. 1, the controller 50 is small in size and light in weight and can be directly installed on the frame 20, allowing for a compact arrangement. The wiring design is simpler and the wires are shorter if the controller 50 is arranged above the battery 40 as shown. In addition, when the controller 50 is installed on the frame 20 and positioned above the battery 40 adjacent to the rear frame body 202, wires can be laid along the rear frame body 202. In this way; the wiring arrangement is more reliable and more convenient.

In some configurations, a shell can be attached to the frame 20 such that the controller 50, the front fork steering component 30, and the battery 40 are positioned inside the shell. The shell can provide both an aesthetic and a protective effect.

With reference to FIGS. 6-10, the kart 1000 further comprises a positioning structure 70 for fixing the battery 40 on the baseplate 10. The positioning structure 70 comprises a lock piece 701 used for locking and positioning the battery 40 on the baseplate 10.

Figure 6:
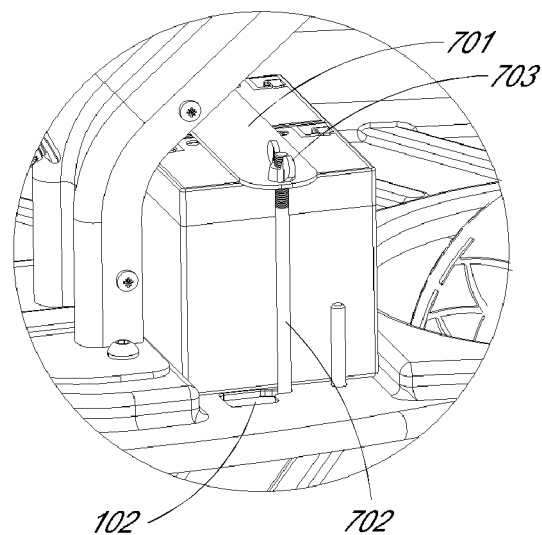
FIG. 6 is an enlarged view of area A shown in FIG. 5.
Figure 7:
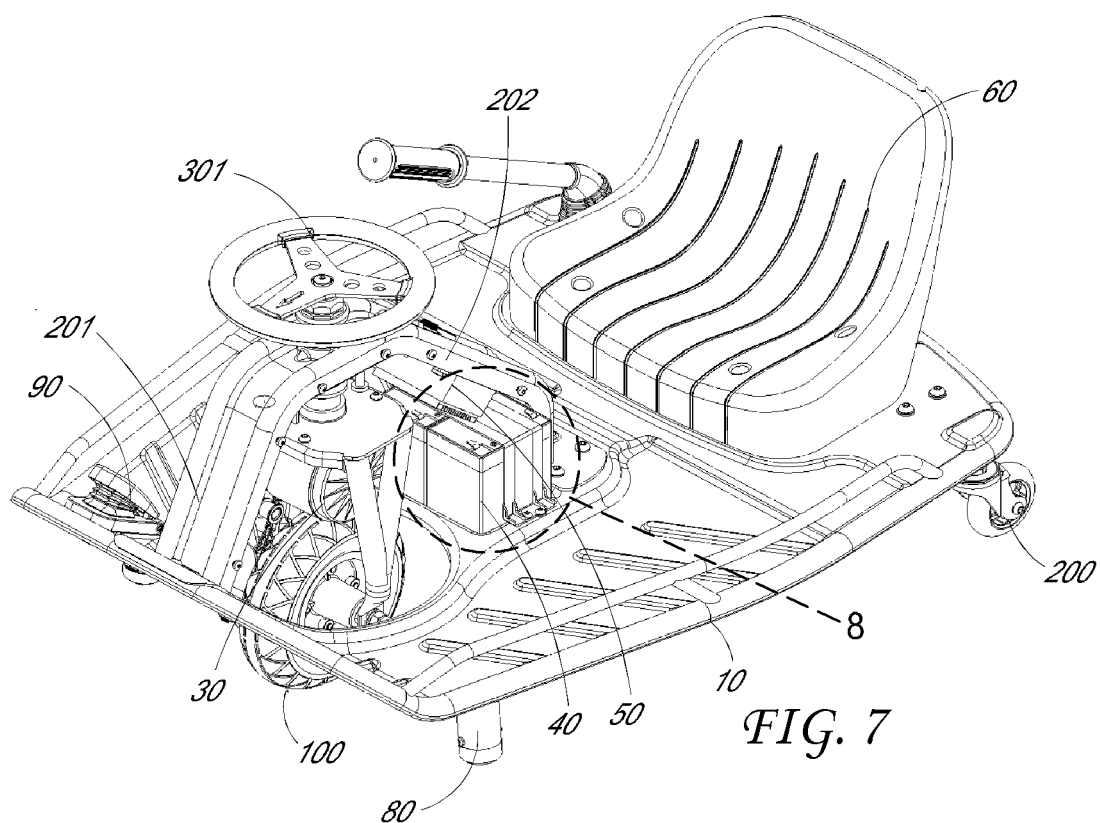
FIG. 7 is another perspective view of the kart in accordance with an embodiment of the invention.
Figure 9:
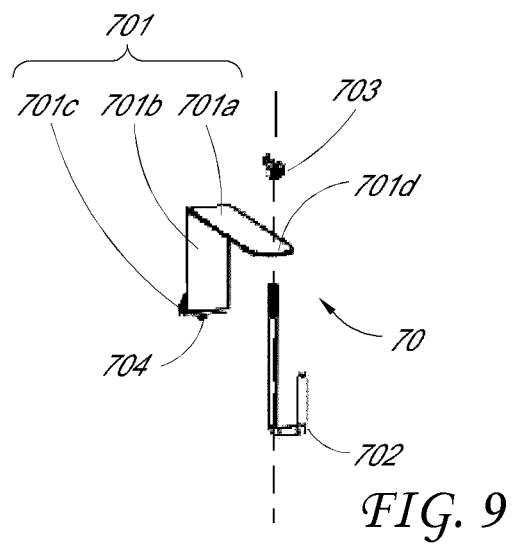
FIG. 9 is a perspective view of a positioning structure according to one embodiment of the invention.

As shown in FIGS. 6 and 9, the lock piece 701 comprises a transverse segment 701*a* connected to the upper surface of the battery 40, a lateral segment 701*b* positioned along the side of the battery 40, and a transverse permanent seat segment 701*c* fixed to the baseplate 10. The lock piece 701 has at least a portion that is approximately shaped like a "Z". The transverse segment 701*a* is provided with a plughole 701*d*.

The positioning structure 70 also comprises a lock hook 702. The baseplate 10 is provided with a hook part, and the lock hook 702 is hooked to the hook part. The transverse segment 701*a* of the lock piece 701 is slightly longer than the battery 40. One end of the lock hook 702 can be inserted into the plughole 701*d* on the end of the transverse segment 701*a*. After one end of the lock hook 702 is inserted into the plughole 701*d*, the lock hook 702 is fixed to the lock piece 701 by any mechanical means, including a matching screw and nut pair 703. In some configurations, the nut 703 can be a butterfly nut.

Figure 8:
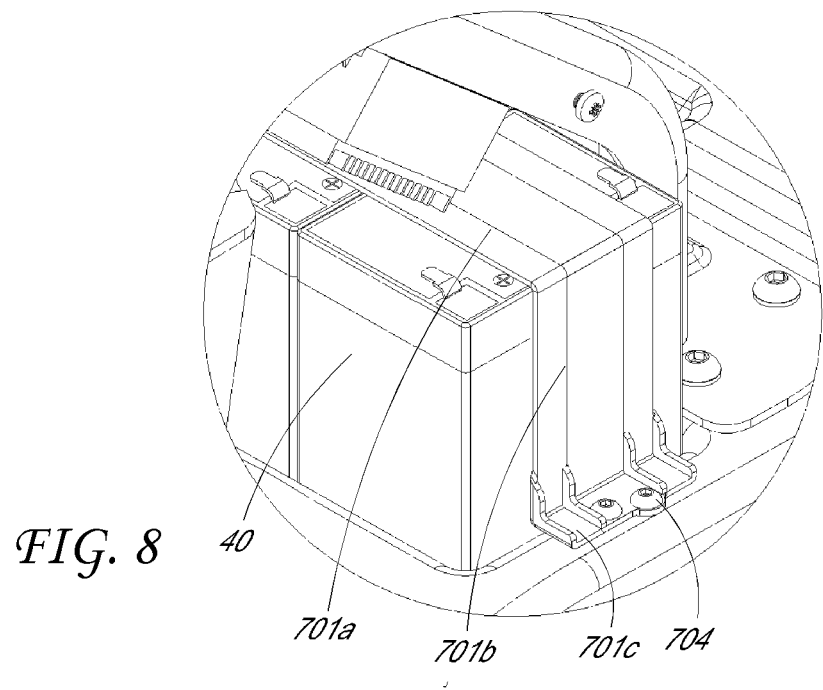
FIG. 8 is an enlarged view of area B shown in FIG. 7.

The transverse permanent seat portion 701*c* is fixed to the baseplate 10 by screws as shown in FIGS. 8 and 9. The positioning structure 70 also comprises a screw bolt 704. A through hole passes through the baseplate 10 and the transverse permanent seat 701*c* correspondingly such that the screw bolt 704 passes through the through hole to attach the baseplate 10 and the transverse permanent seat 701*c*. In some configurations, the transverse permanent seat 701*c* can be attached to the baseplate 10 by other means, for example, clamping fixation.

Figure 10:
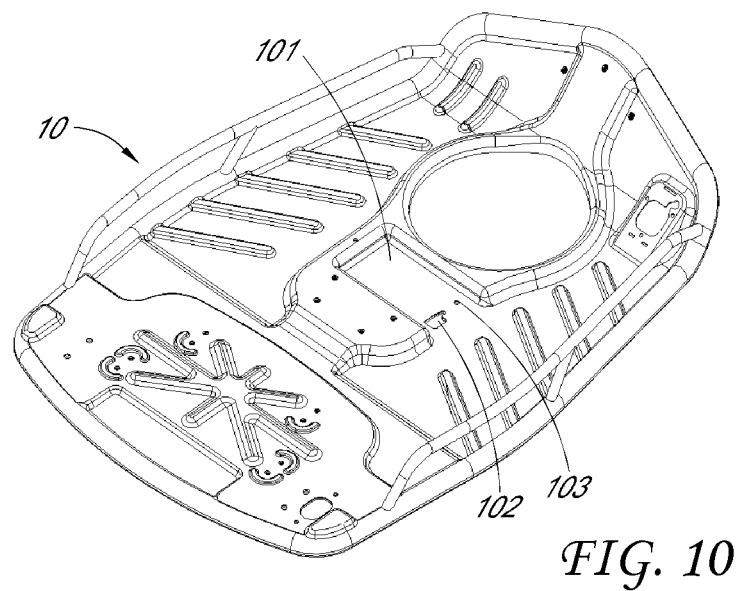
FIG. 10 is a perspective view of a baseplate for a kart according to one embodiment of the invention.
Figure 11:
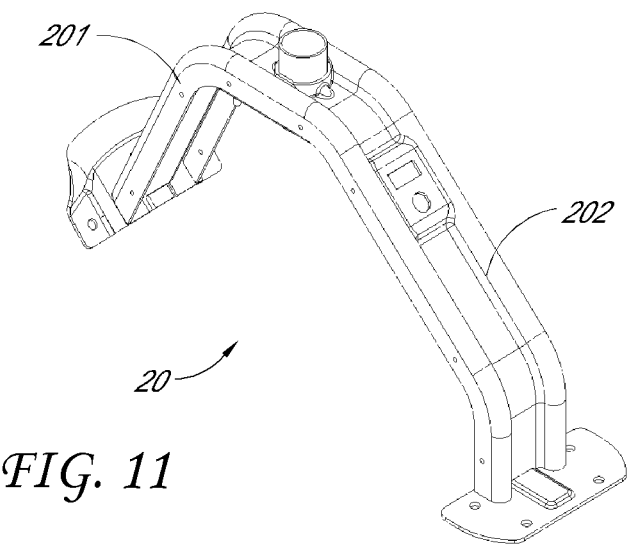
FIG. 11 is a perspective view of a frame or gantry structure for a kart according to one embodiment.

The baseplate 10, as shown in FIGS. 6 and 10, is provided with an insertion hole 102 and a hook hole 103. The hook part of the lock hook 702 can be wholly inserted into the insertion hole 102. After the hook part of the lock hook 702 is inserted into the insertion hole 102 and positioned below the baseplate 10, the lock hook 702 can be adjusted until the hook of the lock hook 702 is aligned with the hook hole 103 and hooked to the baseplate 10.

In some configurations, other hook modes can also be used. For example, a lug boss can be directly attached to the baseplate 10, serving as the hook part. The lug boss may include a through hole for hooking onto the baseplate 10, or two holes matched with the lock hook 702 may be formed through the baseplate 10 such that the lock hook 702 threads through the holes from bottom to top to secure the lock hook 702 and battery 40 to the baseplate 10. The illustrated hook mode is the more preferable method of attachment due to manufacturing simplicity and convenient assembly and disassembly.

As shown in FIG. 10, the baseplate 10 also includes an installation trough, depression or slot 101 and the battery 40 is held in place by the lock piece 701 inside the installation trough 101. After being fixed into place, the battery 40 is limited in terms of up-and-down movement. The left-and-right movement of the battery 40 is limited by the dimensions of the installation slot 101. Therefore, the battery 40 can be stably and reliably fixed to the baseplate 10. Placement of the battery 40 within the installation slot 101 reduces the possibility of movement of battery 40 more so than attaching the battery 40 to the baseplate 10 with only the lock piece 701.

To install the battery 40 on the kart 1000, the battery 40 is first placed into the installation slot. The lock piece 701 is placed around the battery 40, and the transverse permanent seat 701*c* of the lock piece 701 is fixed to the baseplate 10. Next, the lock hook 702 is inserted into the insertion hole 102 and shifted until the hook is aligned with the hook hole 103. The lock hook 702 is lifted upward and locked, hooking to the baseplate 10. Simultaneously, the other end of the lock hook 702 is inserted into the plughole 701*d* of the transverse segment 701*a* of the lock piece 701. To securely attach the lock hook 702 and the lock piece 701, the, the butterfly nut 703 is securely fastened. Disassembly of the battery 40 from the baseplate 10 is a reversal of the above process.

In addition to using the lock piece 701 as the positioning structure 70 of the battery 40, the battery 40 can also be installed and fixed to the baseplate 10 in other ways. For example, the battery box can be directly welded to the baseplate 10, or a housing may be used to secure the battery 40. Use of the lock piece 701 for securing the battery 40 to the baseplate 10 allows the battery 40 to dissipate heat. Additionally, use of the lock piece 701 with the lock hook 702 allows the lock piece 701 to be adjustable depending on the size of the battery and the amount of force needed secure the battery to the kart.

The baseplate 10 of the kart 1000 and/or the frame 20 can be made of a one-piece sheet-metal structure. The one-piece sheet-metal structure provides advantages such as good overall performance and high strength and rigidity.

Figure 12:
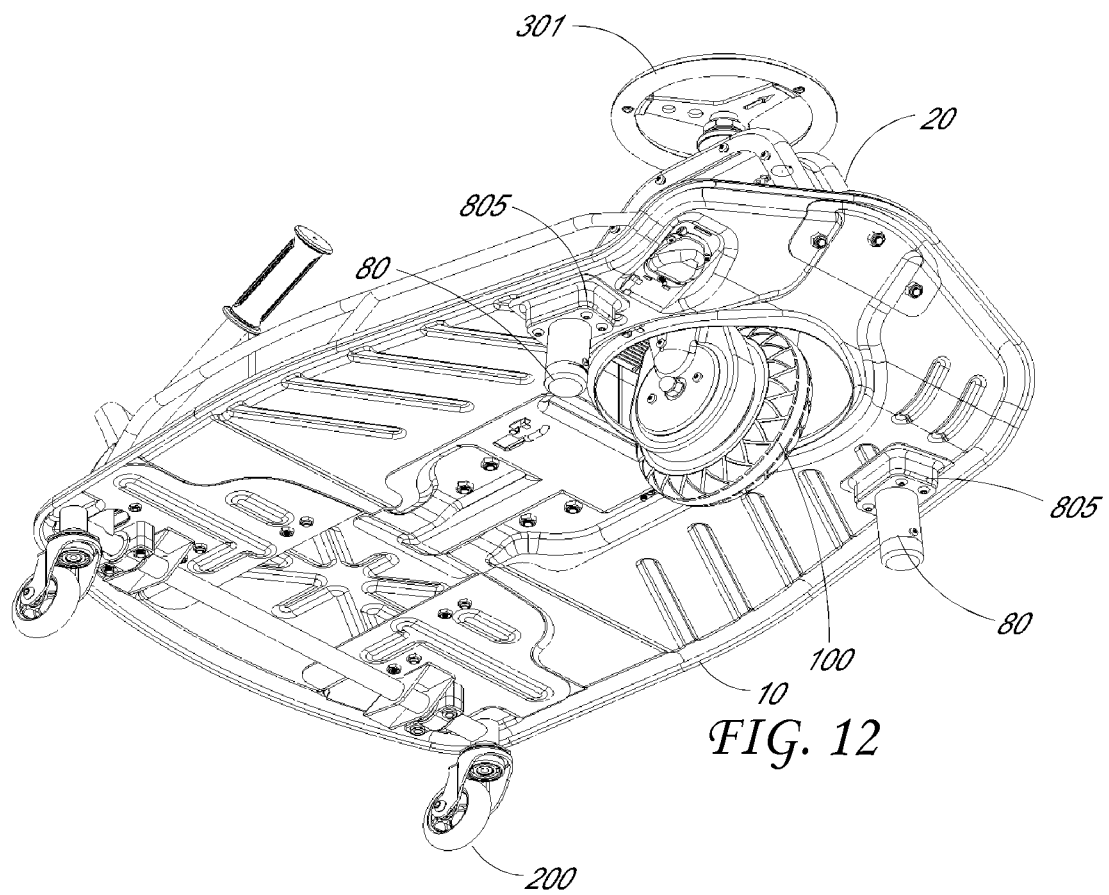
FIG. 12 is an underside view of the kart according to an embodiment.

With reference to FIG. 12, illustrating an underside perspective view of the kart 1000, both sides of the baseplate 10 can be provided respectively with an anti-sway pillar or anti-roll column 80. The anti-sway pillars 80 are configured such that they do not impact the ground when the kart is in normal operation. In other words, when the kart 1000 is horizontal and supported by the driving front wheel 1000 and the rear wheels 200, the anti-sway pillars 80 extend from the baseplate 10 to a point above the ground, not influencing normal running of the driving front wheel 100 and the rear wheels 200 of the kart 1000. When the kart inclines to a certain angle side to side, one of the anti-sway pillars 80 touches the ground so as to prevent the kart from further inclination and possible toppling. The anti-sway effect is particularly advantageous for vehicles provided with only one driving front wheel 100. The selected distance from the anti-sway pillar 80 to the ground is designed on the basis of a desired anti-sway angle. The anti-sway pillars 80 can be connected to the bottom of the baseplate 10, so as to not influence the overall appearance of the kart.

As illustrated in FIG. 12, the anti-sway pillars 80 can be arranged at the front end of the kart 1000. The front end of the kart is prone to tipping if the kart inclines during running. Therefore, to prevent the kart from tipping over, the anti-sway pillars 80 are preferably located at the front end of the kart. In addition, the anti-sway pillars 80 also can be arranged at a certain distance behind at least a portion of the driving front wheel 100 (e.g. a front edge of the wheel 100), not only inhibiting, limiting or preventing rollover, but also effectively inhibiting, limiting or preventing the kart from tipping forward.

Figure 13:
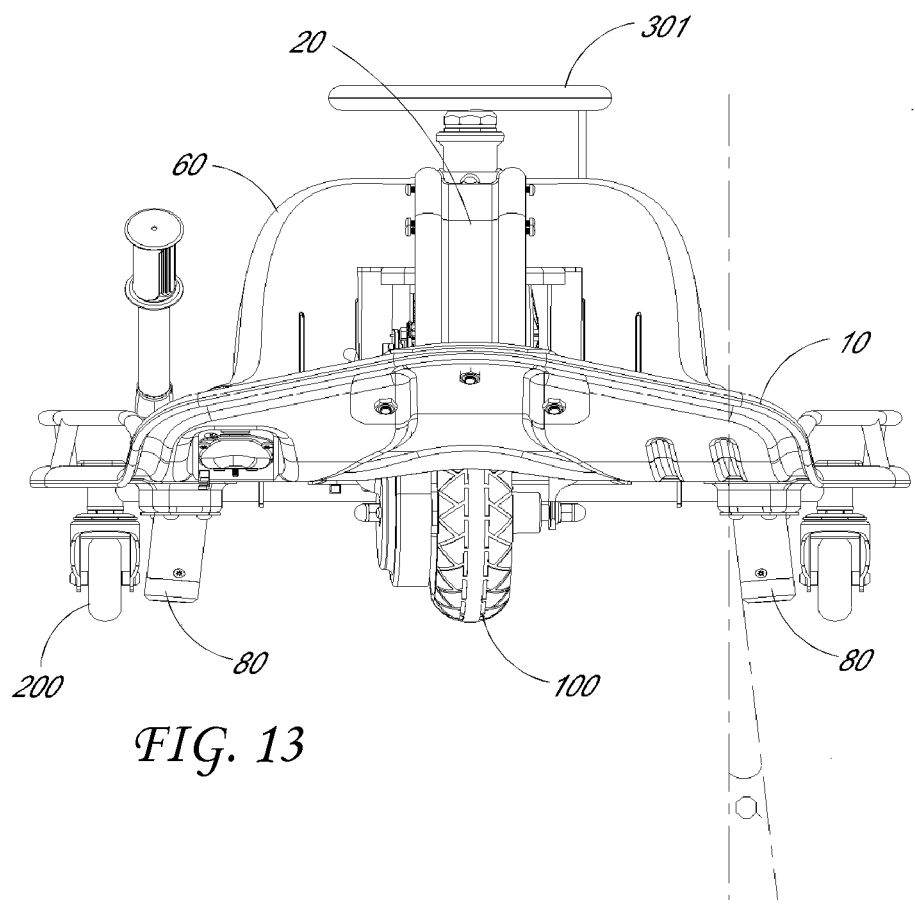
FIG. 13 is a front view of the kart according to an embodiment.

With reference to FIG. 13, which is a front view of the kart 1000, it is preferable that both sides of the baseplate 10 are provided with an anti-sway pillar 80. As shown in FIG. 4, both anti-sway pillars 80 are arranged symmetrically, to provide better roll-over protection and also control the production cost. Other configurations may include more than two anti-sway pillars 80.

In the above-mentioned configurations, the anti-sway pillars 80 are connected to the baseplate 10 at an angle relative to the vertical direction. As shown in FIG. 13, each of the anti-sway pillars 80 is mounted at an angle "a" with respect to the vertical direction. When the kart tilts laterally, the anti-sway pillar 80 on the side of the kart that is tilted downward touches the ground. The reactive force from the ground applies a component force opposite to the overturning direction, and the component force is enlarged due to inclining arrangement, thus providing more effective rollover protection.

As mentioned above, the anti-sway pillars 80 each have a certain height according to the desired amount of roll-over protection, inhibition or limitation. The angle of inclination (the angle "a" relative to the vertical direction) of the anti-sway pillars 80 can be between about 5 degrees-15 degrees, in some configurations, providing an anti-sway or tipping effect.

Figure 14:
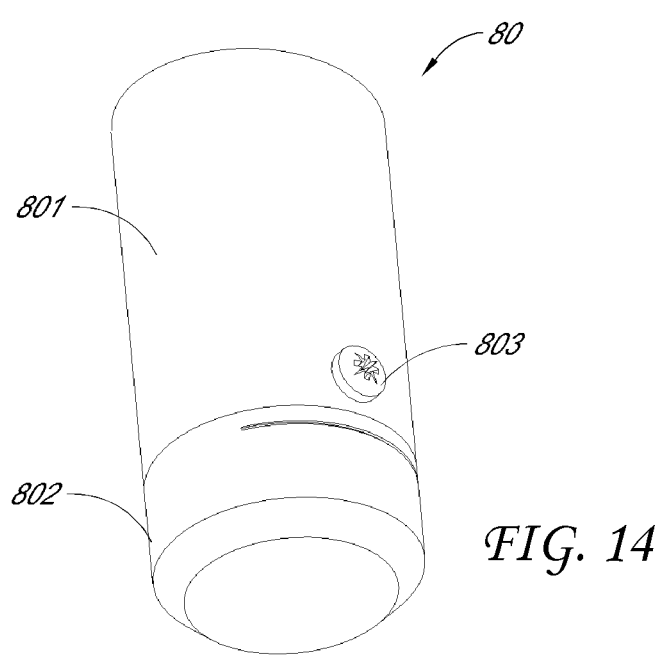
FIG. 14 is a perspective view of an anti-sway pillar or anti-roll column that may be used with a kart such as the kart illustrated in FIG. 1.

FIG. 14 is a diagram of the anti-sway pillar 80. The anti-sway pillar 80 comprises a metal cylinder 801 and a wear-proof casing 802 located at one end of the metal cylinder 801. The other end of the metal cylinder 801 is attached to the baseplate 10, with the wear-proof casing 802 facing towards the ground. In order to inhibit, limit, or prevent the kart 1000 from rollover, the anti-sway pillar 80 may be subject to a large bearing force. The metal cylinder 801 is preferably strong enough to withstand the bearing force. Moreover, when the anti-sway pillar 80 touches the ground to provide roll-over protection, the wear-proof casing 802 can prolong the service life of the anti-sway pillar 80.

The wear-proof casing 802 can be detachably installed on the metal cylinder 801. For example, in some configurations, the wear-proof casing 802 can be attached to the metal cylinder 801 via a threaded connection or may be press fit to the metal cylinder 801. In some configurations, as shown in FIG. 14, the wear-proof casing 802 is attached to the metal cylinder 801 by one or more fasteners (e.g., bolts or screws 803). Thus, the wear-proof casing 802 can be easily replaced if it becomes worn with no need to replace the entire metal cylinder 801, thereby reducing maintenance costs and facilitating maintenance.

Furthermore, the metal cylinder 801 of the anti-sway pillar 80 can be a hollow structure. The metal cylinder 801 having a hollow structure has the advantages of reducing cost and improving buffering.

The anti-sway pillar 80 can be directly thread screwed into the bottom of the baseplate 10 or fixed to the bottom of the baseplate 10 with a bolt. As shown in FIG. 12, the anti-sway pillar 80 may be provided with a mounting base 805 which is fixed to the bottom of the baseplate 10 with a bolt or a plurality of bolts. In some configurations, the metal cylinder 801 of the anti-sway pillar 80 can also be welded to the bottom of the baseplate 10.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A retention device for a kart battery, comprising:
   a baseplate comprising a hook hole and an insertion hole;
   a bracket comprising a transverse section that can apply a force to a surface of the battery, the bracket further comprising a lateral section that is coupled to the baseplate, wherein the transverse section comprises a socket; and
   a locking hook and a nut, the locking hook comprising:
      a first upwardly extending portion;
      a second upwardly extending portion spaced apart from the first upwardly extending portion;
      an intermediate portion that connects the first upwardly extending portion and the second upwardly extending portion; and
      an end that is configured to be inserted into the socket of the bracket and fixed to the transverse section by the nut,
   wherein the insertion hole is configured to receive a part of the locking hook therethrough and to enable the locking hook to be translated, relative to the baseplate, generally toward the hook hole;
   wherein the hook hole is configured to receive the second upwardly extending portion of the locking hook after the locking hook has been inserted into the insertion hole and translated generally toward the hook hole; and
   wherein the intermediate portion of the locking hook is configured to engage the baseplate between the insertion hole and the hook hole.

2. A kart, comprising:
   a frame;
   a seat supported by the frame;
   a battery configured to power the kart;
   the retention device of claim 1;
   a front fork rotatably supported by the frame;
   a front wheel rotatably supported by the front fork;
   a motor operably coupled to the front wheel so that it can drive the front wheel; and
   a controller operably coupled to the motor and configured to control a speed of the kart, the controller comprising:
      a pedestal;
      a pedal, wherein one end of the pedal is articulated with respect to the pedestal and the pedal maintains a certain angle with respect to the pedestal; and
      a sensor connected to the controller, the sensor configured to determine a displacement signal of the pedal;
   wherein the controller controls the speed of the kart based on the displacement signal detected by the sensor, and
   wherein the baseplate or frame supports an anti-sway pillar extending below the baseplate or frame, the one anti-way pillar configured to contact a driving surface during a turning action of the kart and configured to inhibit the kart from tipping laterally.

3. The kart of claim 2, wherein the battery is supported by the baseplate adjacent the front wheel and forward of the seat, and the controller is supported by the frame facing a rider on the kart.

4. The kart of claim 3, wherein the front fork is arranged along a longitudinal axis of the frame, and the battery is supported by the baseplate and positioned on the longitudinal axis of the frame.

5. The kart of claim 4, further comprising a shell configured to cover a top portion of the frame and enclose at least a portion of the battery, the controller, and the front fork.

6. The kart of claim 3, further comprising a positioning structure configured to attach the battery to the baseplate, the positioning structure comprising a lock piece, a lock hook and a nut, wherein the lock piece comprises a transverse segment configured to attach to an upper surface of the battery, a lateral segment positioned at a lateral side of the battery, and a transverse permanent seat attached to the baseplate, the transverse segment including a plughole such that one end of a lock hook can be inserted into the plughole and fixed to the transverse segment of the lock piece by the nut.

7. The kart of claim 6, wherein the baseplate further comprises an installation slot and the battery is locked by the lock piece inside the installation slot.

8. The retention device of claim 1, further comprising a bolt such that the bracket is fixed to the baseplate by the bolt passing through the lateral section of the bracket.

9. The retention device of claim 8, wherein the nut is a wing nut.

10. The retention device of claim 1, wherein the baseplate forms at least a portion of a ridable kart.

11. The retention device of claim 1, wherein the baseplate forms a kart baseplate of a ridable kart.

12. The retention device of claim 1, wherein the baseplate further comprises an installation slot such that the bracket is configured to retain the battery in the installation slot.

13. A kart, comprising:
   a frame;
   a seat supported by the frame;
   a battery configured to power the kart; and
   a retention device for the battery, the retention device comprising:
      a baseplate comprising a hook hole and an insertion hole;
      a bracket comprising a transverse section that can apply a force to a surface of the battery, the bracket further comprising a lateral section that is coupled to the baseplate, wherein the transverse section comprises a socket; and
      a locking hook and a nut, the locking hook comprising:
         a first upwardly extending portion;
         a second upwardly extending portion spaced apart from the first upwardly extending portion;
         an intermediate portion that connects the first upwardly extending portion and the second upwardly extending portion; and
         an end that is configured to be inserted into the socket of the bracket and fixed to the transverse section by the nut;
      wherein the insertion hole is configured to receive a part of the locking hook therethrough and to enable the locking hook to be translated, relative to the baseplate, generally toward the hook hole;
      wherein the hook hole is configured to receive the second upwardly extending portion of the locking hook after the locking hook has been inserted into the insertion hole and translated generally toward the hook hole; and
      wherein the intermediate portion of the locking hook is configured to engage the baseplate between the insertion hole and the hook hole.

14. The kart of claim 13, wherein the baseplate is supported by the frame.

15. The kart of claim 13, further comprising a front fork rotatably supported by the frame and a front wheel rotatably supported by the front fork.

16. The kart of claim 15, further comprising a motor operably coupled to the front wheel so that it can drive the front wheel.

17. The kart of claim 16, further comprising a controller operably coupled to the motor and configured to control a speed of the kart.

18. The kart of claim 17, wherein the controller comprises:
- a pedestal;
- a pedal, wherein one end of the pedal is articulated with respect to the pedestal and the pedal maintains a certain angle with respect to the pedestal; and
- a sensor connected to the controller, the sensor configured to determine a displacement signal of the pedal.

19. The kart of claim 18, wherein the controller controls the speed of the kart based on the displacement signal detected by the sensor.

20. The kart of claim 13, wherein the baseplate or frame supports an anti-sway pillar extending below the baseplate or frame, the one anti-way pillar configured to contact a driving surface during a turning action of the kart and configured to inhibit the kart from tipping laterally.

* * * * *